United States Patent
Mikoshiba et al.

(10) Patent No.: US 12,522,934 B2
(45) Date of Patent: Jan. 13, 2026

(54) CARBON DIOXIDE REACTION APPARATUS

(71) Applicant: KABUSHIKI KAISHA TOSHIBA, Minato-ku (JP)

(72) Inventors: Satoshi Mikoshiba, Yamato (JP); Asahi Motoshige, Oto (JP); Ryota Kitagawa, Setagaya (JP); Akihiko Ono, Kita (JP); Yusuke Kofuji, Yokohama (JP); Yuki Kudo, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 62 days.

(21) Appl. No.: 18/301,711

(22) Filed: Apr. 17, 2023

(65) Prior Publication Data

US 2023/0250546 A1   Aug. 10, 2023

Related U.S. Application Data

(63) Continuation of application No. 17/009,221, filed on Sep. 1, 2020, now abandoned.

(30) Foreign Application Priority Data

Mar. 23, 2020   (JP) .................. 2020-050556

(51) Int. Cl.
*C25B 15/08*   (2006.01)
*C25B 1/04*   (2021.01)
(Continued)

(52) U.S. Cl.
CPC ............... *C25B 15/08* (2013.01); *C25B 1/04* (2013.01); *C25B 3/26* (2021.01); *C25B 9/19* (2021.01);
(Continued)

(58) Field of Classification Search
CPC .. C25B 1/04; C25B 15/08; C25B 3/26; C25B 9/19; C25B 9/77; C25B 15/081;
(Continued)

(56) References Cited

U.S. PATENT DOCUMENTS

2013/0214542 A1   8/2013   Knop et al.
2015/0152562 A1   6/2015   Bernical
(Continued)

FOREIGN PATENT DOCUMENTS

JP   2004-099927 A   4/2004
JP   2015-533944 A   11/2015
(Continued)

OTHER PUBLICATIONS

Notice of Reasons for Refusal issued May 7, 2024, in corresponding Japanese Patent Application No. 2023-096050 (with English Translation), citing document 15 therein, 6 pages.

(Continued)

*Primary Examiner* — Ciel P Contreras
(74) *Attorney, Agent, or Firm* — Oblon, McClelland, Maier & Neustadt, L.L.P.

(57) ABSTRACT

$CO_2$ reaction methods may include: supplying $CO_2$-containing gas to a first accommodation part (AP) of an electrochemical reaction cell (ERC) from a first supply unit, the ERC including the first AP, a second AP, a cathode in the first AP, and an anode in the second AP; supplying an electrolytic solution containing $H_2O$ to the second AP; controlling ERC temperature to 60 to 150° C. so discharged gas and discharged solution discharged from the first and second APs are 60 to 100° C.; supplying current to the electrodes, reducing the $CO_2$ at the reduction electrode and discharge gas from the first AP, and oxidizing $H_2O$ and discharge the solution containing $O_2$ and $CO_2$ from the second AP; separating $O_2$ and $CO_2$ gas from the discharged solution; com- (Continued)

busting the $O_2$ to produce $CO_2$, and discharging mixed-$CO_2$ gas containing combustion $CO_2$ and $CO_2$; and supplying the mixed-$CO_2$ gas to the first AP.

4 Claims, 7 Drawing Sheets

(51) Int. Cl.
    *C25B 3/26*           (2021.01)
    *C25B 9/19*           (2021.01)
    *C25B 9/77*           (2021.01)

(52) U.S. Cl.
    CPC .............. *C25B 9/77* (2021.01); *C25B 15/081* (2021.01); *C25B 15/083* (2021.01); *C25B 15/087* (2021.01)

(58) Field of Classification Search
    CPC ....... C25B 15/083; C25B 15/087; C25B 1/23; C25B 3/03; C25B 3/07
    See application file for complete search history.

(56) References Cited

U.S. PATENT DOCUMENTS

| | | |
|---|---|---|
| 2016/0369409 A1 | 12/2016 | Kudo et al. |
| 2017/0218404 A1 | 8/2017 | Simpson et al. |
| 2018/0119294 A1 | 5/2018 | Kitagawa et al. |
| 2018/0265440 A1* | 9/2018 | Kudo ........................ C25B 9/19 |
| 2018/0274113 A1 | 9/2018 | Kitagawa et al. |
| 2019/0062643 A1* | 2/2019 | Jahnke ...................... C01B 3/34 |
| 2019/0233952 A1 | 8/2019 | Sheehan |
| 2019/0249315 A1 | 8/2019 | Mihalcea et al. |
| 2020/0010771 A1 | 1/2020 | Yoon |
| 2020/0017985 A1 | 1/2020 | Yamagiwa et al. |
| 2020/0149170 A1 | 5/2020 | Hanebuth et al. |
| 2021/0079543 A1 | 3/2021 | Mikoshiba et al. |
| 2021/0348286 A1 | 11/2021 | Bulan |

FOREIGN PATENT DOCUMENTS

| | | | |
|---|---|---|---|
| JP | 2017-048087 A | 3/2017 | |
| JP | 2018-70936 A | 5/2018 | |
| JP | 2018-153735 A | 10/2018 | |
| JP | 2019-506165 A | 3/2019 | |
| JP | 2021-46576 A | 3/2021 | |
| JP | 2021-147679 A | 9/2021 | |
| KR | 20160036881 A * | 4/2016 | ............. C25B 15/08 |
| WO | WO 2014/042781 A2 | 3/2014 | |
| WO | 2015/015919 A1 | 1/2019 | |
| WO | 2019/015919 A1 | 1/2019 | |
| WO | WO 2020/057998 A1 | 3/2020 | |

OTHER PUBLICATIONS

Decision to Grant a Patent dated Oct. 8, 2024, in corresponding Japanese Patent Application No. 2023-096050 (with English translation) citing documents 15 and 16 therein.

\* cited by examiner

US 12,522,934 B2

CARBON DIOXIDE REACTION APPARATUS

CROSS REFERENCE TO RELATED APPLICATION

The present application is a continuation of U.S. application Ser. No. 17/009,221, filed on Mar. 23, 2020, and published as US 2021/0292925 A1, claiming the benefit of priority from Japanese Patent Application No. 2020-050556, filed on Mar. 23, 2020, the content of each of which is incorporated by reference herein in its entirety.

FIELD

Embodiments described herein relate generally to a carbon dioxide reaction apparatus.

BACKGROUND

In recent years, there is a concern over depletion of fossil fuel resources such as petroleum and coal, and expectations of sustainable renewable energy increase. From the viewpoint of such energy problems, environmental problems, and so on, an artificial photosynthesis technology is under development that electrochemically reduces carbon dioxide using renewable energy of sunlight or the like to generate a stockable chemical energy source. A carbon dioxide reaction apparatus including an electrolytic device that achieves the artificial photosynthesis technology includes, for example, an anode that oxidizes water ($H_2O$) to produce oxygen ($O_2$), and a cathode that reduces carbon dioxide ($CO_2$) to produce a carbon compound. The anode and the cathode of the carbon dioxide reaction apparatus are connected to a power supply derived from renewable energy such as solar power generation, hydroelectric power generation, wind power generation, or geothermal power generation.

The cathode of the carbon dioxide reaction apparatus is arranged, for example, to be immersed in water in which $CO_2$ is dissolved or to be in contact with $CO_2$ flowing through a flow path. The cathode obtains reduction potential for $CO_2$ from the power supply derived from renewable energy and thereby reduces $CO_2$ to produce carbon compounds such as carbon monoxide (CO), formic acid (HCOOH), methanol ($CH_3OH$), methane ($CH_4$), ethanol ($C_2H_5OH$), ethane ($C_2H_6$), ethylene ($C_2H_4$), and ethylene glycol ($C_2H_6O_2$). The anode is arranged to be in contact with an electrolytic solution containing water ($H_2O$), and oxygen ($O_2$) and a hydrogen ion ($H^+$) are produced. Such a carbon dioxide reaction apparatus is required to increase the use efficiency of $CO_2$, as well as the use efficiency and the utility value of reduction products of $CO_2$.

SUMMARY

A problem to be solved by the present invention is to provide a carbon dioxide reaction apparatus capable of increasing the use efficiency of $CO_2$.

A carbon dioxide reaction apparatus, comprising: an electrochemical reaction cell including, a first accommodation part that accommodates gas containing carbon dioxide or a first electrolytic solution containing carbon dioxide, a second accommodation part that accommodates a second electrolytic solution containing water, a diaphragm provided between the first accommodation part and the second accommodation part, a cathode arranged to be in contact with the gas or the first electrolytic solution to reduce carbon dioxide to produce a carbon compound, and an anode arranged to be in contact with the second electrolytic solution to oxidize water to produce oxygen; a first supply mechanism that supplies the gas or the first electrolytic solution to the first accommodation part; a second supply mechanism that supplies the second electrolytic solution to the second accommodation part; and a first carbon dioxide separator that separates carbon dioxide from a gas component in a second accommodation discharge discharged from the second accommodation part, the second accommodation discharge containing oxygen and carbon dioxide.

DETAILED DESCRIPTION

Figure 1:
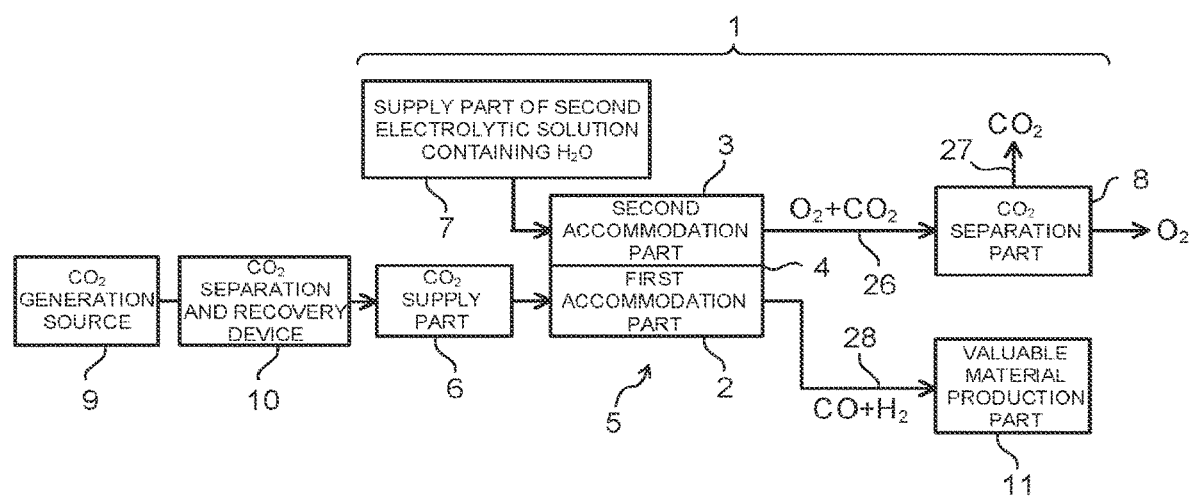
FIG. 1 is a diagram illustrating a carbon dioxide reaction apparatus in a first embodiment.

Carbon dioxide reaction apparatuses in embodiments will be explained hereinafter with reference to the drawings. Substantially the same components are denoted by the same reference numerals, and a part of explanation thereof may be omitted in some cases in the embodiments described below. The drawings are schematic, and the relation between thicknesses and plane dimensions, ratios between the thicknesses of the parts, and the like may differ from actual ones.

(First embodiment) FIG. 1 is a diagram illustrating a carbon dioxide reaction apparatus 1 in a first embodiment. The carbon dioxide reaction apparatus 1 illustrated in FIG. 1 includes: an electrochemical reaction cell 5 including a first accommodation part 2 configured to accommodate gas containing carbon dioxide ($CO_2$) or a first electrolytic solution containing $CO_2$, a second accommodation part 3 configured to accommodate a second electrolytic solution containing water ($H_2O$), and a diaphragm 4; a first supply part (a first supply mechanism) 6 that supplies the gas or the first electrolytic solution to the first accommodation part 2; a second supply part (a second supply mechanism) 7 that supplies the second electrolytic solution to the second accommodation part 3; and a carbon dioxide separation part (a carbon dioxide separator) 8 that separates $CO_2$ from a gas component in the discharge, the carbon dioxide separator connecting to a discharge portion to discharge a discharge containing oxygen ($O_2$) and $CO_2$ from the second accommodation part 3. A discharged gas from the second accommodation part 3 will be described in detail later.

A $CO_2$ generation source 9 is connected to the first supply part ($CO_2$ supply part) 6. When a $CO_2$ separation and recovery device 10 is attached to the $CO_2$ generation source 9, the $CO_2$ supply part 6 is connected to the $CO_2$ separation and recovery device 10. The $CO_2$ separation and recovery device 10 may be installed separately from the $CO_2$ generation source 9. Examples of the $CO_2$ generation source 9 include facilities having various incinerators or combustion furnaces such as a thermal power plant and a garbage incinerator, facilities having a steel plant and a blast furnace, and so on. The $CO_2$ generation source 9 may be various factories where $CO_2$ is generated other than these, and so on, and is not limited in particular. To a discharge portion that discharges a discharged gas containing carbon monoxide (CO) and the like from the first accommodation part 2, a valuable material production part (a valuable material production device) 11 is connected. The valuable material production part 11 is a synthesizing part that synthesizes valuable materials using, as a raw material, CO and the like discharged from the first accommodation part 2. The valuable material production part 11 is provided according to need, and may be a tank or the like that stores the discharged gas containing CO instead.

Figure 2:
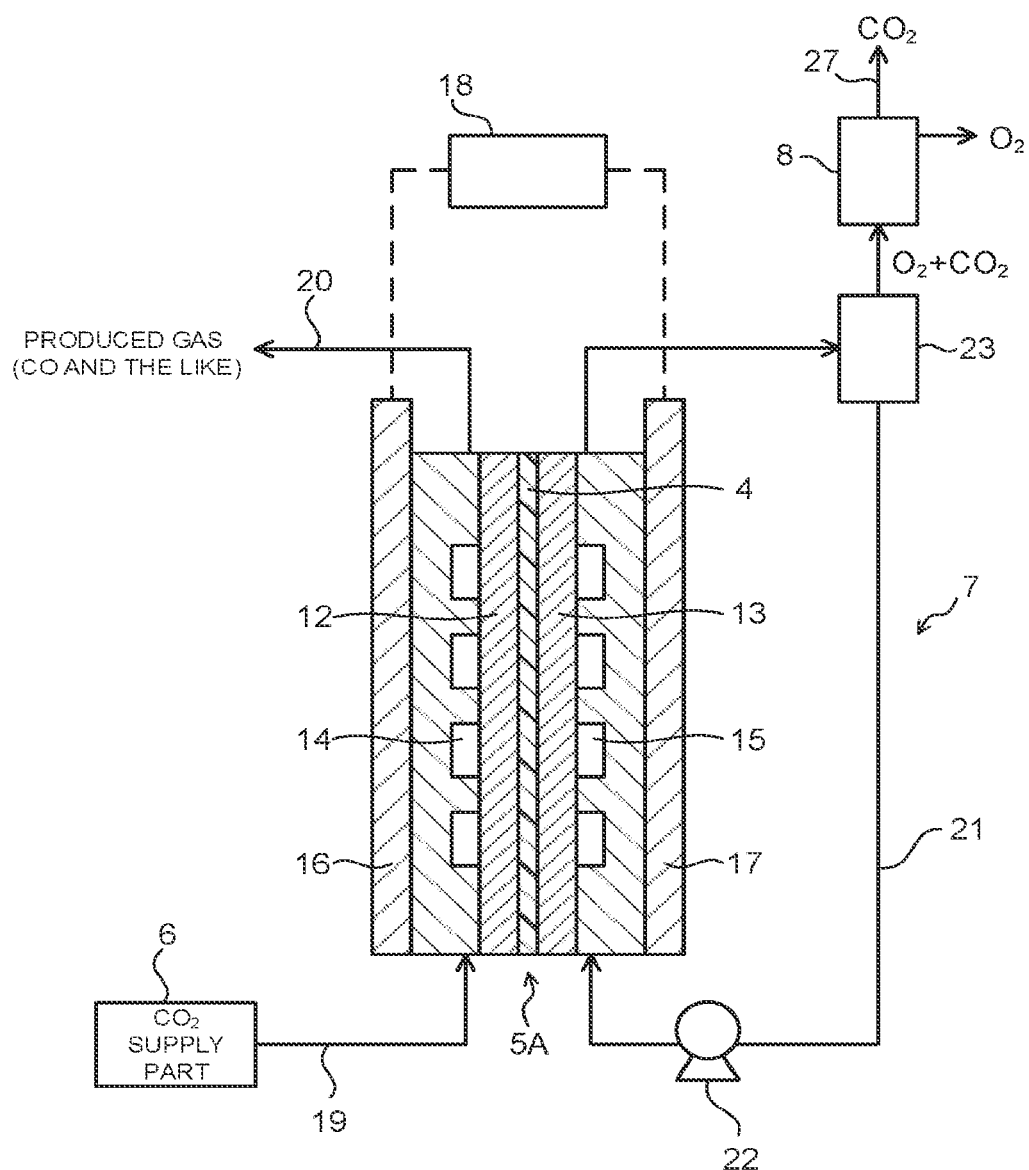
FIG. 2 is a view illustrating a first example of an electrochemical reaction cell in the carbon dioxide reaction apparatus illustrated in FIG. 1.
Figure 3:
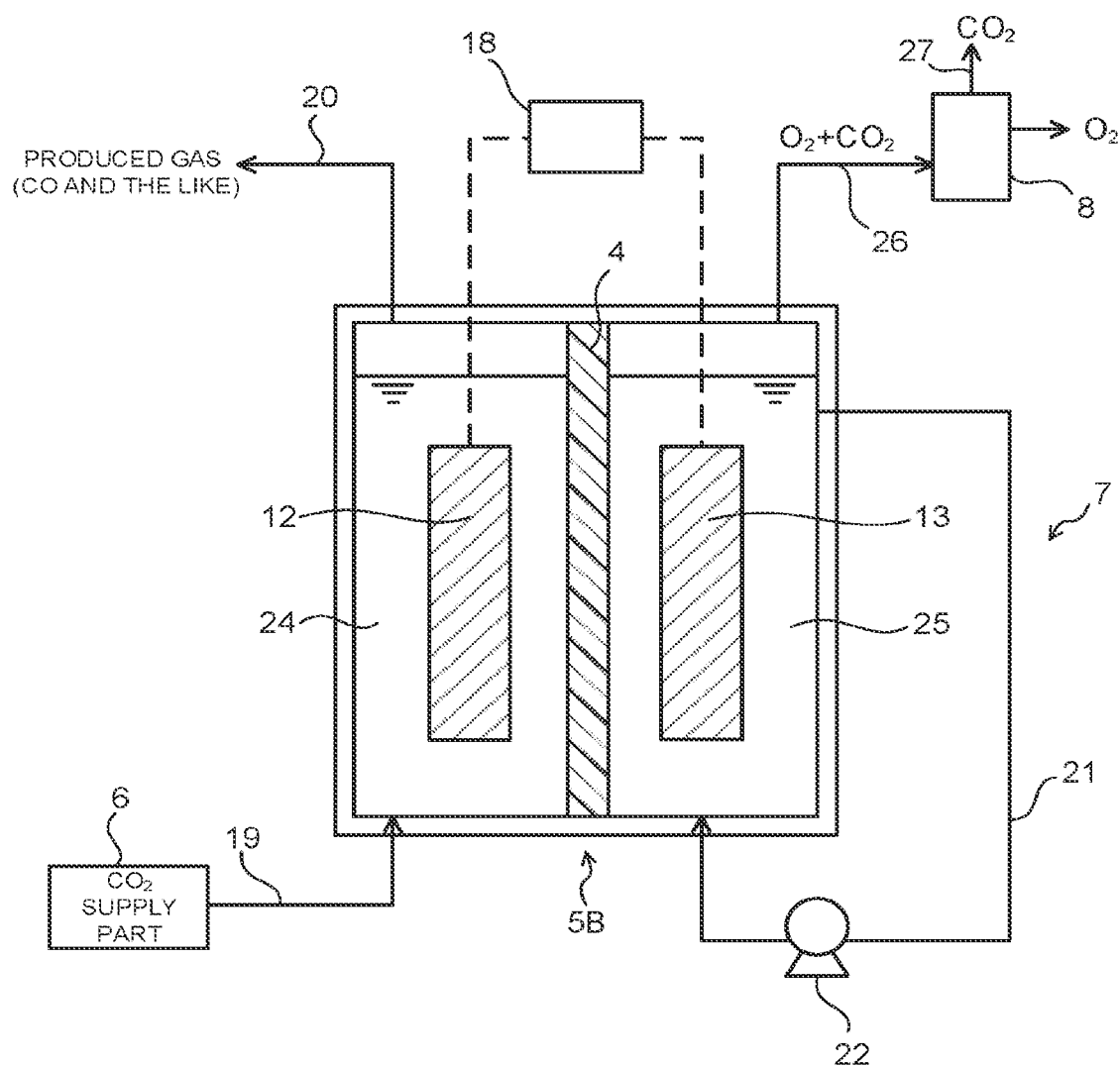
FIG. 3 is a view illustrating a second example of the electrochemical reaction cell in the carbon dioxide reaction apparatus illustrated in FIG. 1.

The electrochemical reaction cell 5 has such a structure as illustrated in FIG. 2 or FIG. 3, for example. The electrochemical reaction cell 5 (5A) illustrated in FIG. 2 includes a cathode (reduction electrode) 12, an anode (oxidation electrode) 13, a diaphragm 4 arranged between the cathode 12 and the anode 13, a first flow path 14 that circulates the gas containing $CO_2$ or the first electrolytic solution containing $CO_2$ to be in contact with the cathode 12, a second flow path 15 that circulates the second electrolytic solution containing water to be in contact with the anode 13, a first current collector plate 16 electrically connected to the cathode 12, and a second current collector plate 17 electrically connected to the anode 13. The first flow path 14 functions as the first accommodation part 2, and the second flow path 15 functions as the second accommodation part 3. The first and second current collector plates 16, 17 in the electrochemical reaction cell 5A are electrically connected to a power supply 18. The electrochemical reaction cell may have a state where a plurality of stacked cells are integrated. When a plurality of cells are arranged in an integrated manner, a stack of 10 to about 150 cells is preferred because the reaction amount of carbon dioxide per unit of site area increases, thus making it possible to increase a process amount.

To the first flow path 14, a first supply flow path 19 that supplies the gas containing $CO_2$ or the first electrolytic solution containing $CO_2$ and a first discharge flow path 20 that discharges a produced gas are connected. The first flow path 14 is connected to the $CO_2$ supply part 6. When supplying the gas containing $CO_2$ to the first flow path 14, the $CO_2$ supply part 6 directly or temporarily stores the $CO_2$ gas supplied from the $CO_2$ separation and recovery device 10 and then supplies it to the first supply flow path 19. When supplying the first electrolytic solution containing $CO_2$ to the first flow path 14, the $CO_2$ supply part 6 mixes the $CO_2$ gas supplied from the $CO_2$ separation and recovery device 10 with the first electrolytic solution and then supplies the mixture to the first supply flow path 19. When supplying the first electrolytic solution containing $CO_2$ to the first flow path 14, a circulation path and a pump that are similar to those on the anode 13 side may be connected to the first flow path 14. In this case, a gas/liquid separation part is connected to the circulation path. The electrochemical reaction cell 5A may include a third flow path (liquid flow path) that circulates the first electrolytic solution (that may or may not contain $CO_2$) to be in contact with the cathode 12 separately from the first flow path (gas flow path) 14.

The second flow path 15 is connected to the electrolytic solution supply part 7. The electrolytic solution supply part 7 includes a circulation path 21 through which the second electrolytic solution is circulated through the second flow path 15 and a pump 22. A gas/liquid separation part 23 is connected to the circulation path 21. In the gas/liquid separation part 23, a liquid component containing the second electrolytic solution and a gas component containing a product are separated, and the liquid component circulates through the circulation path 21 including the second flow path 15 by the pump 22. The gas component separated in the gas/liquid separation part 23 contains oxygen ($O_2$) being a product at the anode 13. Further, as will be described in detail later, $CO_2$ supplied to the first flow path 14 moves to the second flow path 15, and thus, the gas component contains also $CO_2$. A gas component discharge portion of the gas/liquid separation part 23 is connected to the $CO_2$ separation part 8.

The electrochemical reaction cell 5 (5B) illustrated in FIG. 3 includes a first accommodation tank 24 that accommodates the first electrolytic solution containing $CO_2$, a second accommodation tank 25 that accommodates the second electrolytic solution containing $H_2O$, a diaphragm 4 arranged between the first accommodation tank 24 and the second accommodation tank 25, a cathode 12 arranged inside the first accommodation tank 24 so as to be in contact with the first electrolytic solution, and an anode 13 arranged inside the second accommodation tank 25 so as to be in contact with the second electrolytic solution. The first accommodation tank 24 functions as the first accommodation part 2, and the second accommodation tank 25 functions as the second accommodation part 3. The cathode 12 and the anode 13 in the electrochemical reaction cell 5B are electrically connected to the power supply 18.

To the first accommodation tank 24, the first supply flow path 19 that supplies the gas containing $CO_2$ or the first electrolytic solution containing $CO_2$ and the first discharge flow path 20 that discharges a produced gas are connected. The first supply flow path 19 is connected to the $CO_2$ supply part 6. There is a space for storing the produced gas in an upper portion of the first accommodation tank 24, and the first discharge flow path 20 is connected to this space. When supplying the first electrolytic solution containing $CO_2$ into the first accommodation tank 24, the $CO_2$ supply part 6 mixes the $CO_2$ gas supplied from the $CO_2$ separation and recovery device 10 with the first electrolytic solution and supplies the mixture to the first accommodation tank 24. The $CO_2$ supply part 6 may supply the $CO_2$ gas supplied from the $CO_2$ separation and recovery device 10 into the first electrolytic solution accommodated in the first accommodation tank 24. The circulation path and the pump that are similar to those of the second accommodation tank 25 may be connected to the first accommodation tank 24.

The second accommodation tank 25 is connected to the electrolytic solution supply part 7. The electrolytic solution supply part 7 includes the circulation path 21 through which the second electrolytic solution is circulated through the second accommodation tank 25 and the pump 22. There is a space for storing the produced gas in an upper portion of the second accommodation tank 25, and a second discharge flow path 26 is connected to this space. The gas component discharged from the second discharge flow path 26 contains oxygen ($O_2$) being a product at the anode 13 as above, and further contains $CO_2$ because $CO_2$ supplied to the first accommodation tank 24 moves to the second accommodation tank 25. Thus, the second discharge flow path 26 is connected to the $CO_2$ separation part 8.

The first accommodation tank 24 and the second accommodation tank 25 are separated from each other by the diaphragm 4 capable of allowing ions such as hydrogen ions ($H^+$) and hydroxide ions ($OH^-$) to move therethrough, to thereby form a two-chamber structure reaction tank. A two-chamber structure reaction tank (24, 25) may be formed of, for example, quartz white plate glass, polystyrol, polymethacrylate, or the like. A material transmitting light may be used for a part of the two-chamber structure reaction tank (24, 25), and a resin material may be used for the remainder. Examples of the resin material include polyetheretherketone (PEEK), polyamide (PA), polyvinylidene fluoride (PVDF), polyacetal (POM) (copolymer), polyphenyleneether (PPE), acrylonitrile-butadiene-styrene copolymer (ABS), polypropylene (PP), polyethylene (PE), and so on.

The first electrolytic solution to be supplied to the first flow path 14 or the first accommodation tank 24 functions as a cathode solution and contains $CO_2$ as a substance to be reduced. Here, the form of $CO_2$ present in the first electrolytic solution does not have to be in a gaseous form, but may be in the form of dissolved $CO_2$, carbonate ions ($CO_3^{2-}$), hydrogen carbonate ions ($HCO_{3-}$), or the like. The first electrolytic solution may contain hydrogen ions and is preferred to be an aqueous solution. The second electrolytic solution to be supplied to the second flow path 15 or the second accommodation tank 25 functions as an anode solution and contains $H_2O$ as a substance to be oxidized. It is possible to change the amount of water contained in the first and second electrolytic solutions or electrolytic solution components to change the reactivity so as to change the selectivity of a reduced substance or the proportion of a produced substance. The first and second electrolytic solutions may contain redox couples as needed. Examples of the redox couple include $Fe^{3+}/Fe^{2+}$, $IO^{3-}/I^-$, and so on.

The temperature of the electrochemical reaction cell 5 (5A, 5B) is preferably set to the temperature at which the electrolytic solution does not vaporize in a range of room temperature (for example, 25° C.) to 150° C. It is more preferably the temperature in a range of 60° C. to 150° C., and further preferably the temperature in a range of 80° C. to 150° C. In order to set the temperature to less than room temperature, a cooling device such as a chiller is required, which may reduce the energy efficiency of an overall system. When the temperature exceeds 150° C., the water in the electrolytic solution turns into vapor and resistance increases, which may reduce the electrolysis efficiency. The current density of the cathode 12 is not limited in particular, but a higher current density is preferable in order to increase the amount of reduction products produced per unit area. The current density is preferably 100 mA/cm$^2$ or more and 1.5 A/cm$^2$ or less, and further preferably 300 mA/cm$^2$ or more 700 mA/cm$^2$ or less. When the current density is less than 100 mA/cm$^2$, the amount of reduction products produced per unit area is small, which requires a large area. When the current density exceeds 1.5 A/cm$^2$, a side reaction of hydrogen generation increases, leading to a decrease in concentration of the reduction products. In the case where Joule heat also increases by increasing the current density, the temperature increases above the appropriate temperature, so that a cooling mechanism may be provided in or near the electrochemical reaction cell 5. The cooling mechanism may be water cooling or air cooling. Even when the temperature of the electrochemical reaction cell 5 is higher than room temperature, the temperature may be employed as it is as long as it is equal to or less than 150° C.

The first electrolytic solution and the second electrolytic solution may be electrolytic solutions containing different substances or may be the same electrolytic solution containing the same substance. In the case where the first electrolytic solution and the second electrolytic solution contain the same substance and the same solvent, the first electrolytic solution and the second electrolytic solution may be regarded as one electrolytic solution. The pH of the second electrolytic solution is preferred to be higher than the pH of the first electrolytic solution. This makes ions such as the hydrogen ions and the hydroxide ions easy to move through the diaphragm 4. Further, the liquid junction potential due to the difference in pH can effectively promote the oxidation-reduction reaction.

The first electrolytic solution is preferred to be a solution with high absorptance of $CO_2$. The existing form of $CO_2$ in the first electrolytic solution is not always limited to a state of being dissolved therein, but $CO_2$ in an air bubble state may exist to be mixed in the first electrolytic solution. Examples of the electrolytic solution containing $CO_2$ include aqueous solutions containing hydrogencarbonates and carbonates such as lithium hydrogen carbonate ($LiHCO_3$), sodium hydrogen carbonate ($NaHCO_3$), potassium hydrogen carbonate ($KHCO_3$), cesium hydrogen carbonate ($CsHCO_3$), sodium carbonate ($Na_2CO_3$), and potassium carbonate ($K_2CO_3$), phosphoric acid, boric acid, and so on. The electrolytic solution containing $CO_2$ may contain alcohols such as methanol or ethanol, or ketones such as acetone, or may be an alcohol solution or ketone solution. The first electrolytic solution may be an electrolytic solution containing a $CO_2$ absorbent that reduces the reduction potential for $CO_2$, has a high ion conductivity, and absorbs $CO_2$.

As the second electrolytic solution, a solution using water ($H_2O$), for example, an aqueous solution containing an arbitrary electrolyte can be used. The solution is preferred to be an aqueous solution that promotes the oxidation reaction of water. Examples of the aqueous solution containing the electrolyte include aqueous solutions containing phosphate ion ($PO_4^{2-}$), borate ion ($BO_3^{3-}$), sodium ion ($Na^+$), potassium ion ($K^+$), calcium ion ($Ca^{2+}$), lithium ion ($Li^+$), cesium ion ($Cs^+$), magnesium ion ($Mg^{2+}$), chloride ion ($Cl^-$), hydrogen carbonate ion ($HCO_3^-$), carbonate ion ($CO_3^-$), hydroxide ion ($OH^-$), and so on.

As the above-described electrolytic solutions, for example, ionic liquids that are made of salts of cations such as imidazolium ions or pyridinium ions and anions such as $BF_4^-$ or $PF_6^-$ and are in a liquid state in a wide temperature range, or aqueous solutions thereof can be used. Further, examples of other electrolytic solutions include amine solutions such as ethanolamine, imidazole, and pyridine, and aqueous solutions thereof. Examples of amine include primary amine, secondary amine, tertiary amine, and so on. The electrolytic solutions may be high in ion conductivity and have properties of absorbing carbon dioxide and characteristics of lowering the reduction energy.

Examples of the primary amine include methylamine, ethylamine, propylamine, butylamine, pentylamine, hexylamine, and so on. Hydrocarbons of the amine may be substituted by alcohol, halogen, and the like. Examples of amine whose hydrocarbons are substituted include methanolamine, ethanolamine, chloromethylamine, and so on. Further, an unsaturated bond may exist. These hydrocarbons are also the same in the secondary amine and the tertiary amine.

Examples of the secondary amine include dimethylamine, diethylamine, dipropylamine, dibutylamine, dipentylamine, dihexylamine, dimethanolamine, diethanolamine, dipropanolamine, and so on. The substituted hydrocarbons may be different. This also applies to the tertiary amine. Examples with different hydrocarbons include methylethylamine, methylpropylamine, and so on.

Examples of the tertiary amine include trimethylamine, triethylamine, tripropylamine, tributylamine, trihexylamine, trimethanolamine, triethanolamine, tripropanolamine, tributanolamine, trihexanolamine, methyldiethylamine, methyldipropylamine, and so on.

Examples of the cation of the ionic liquid include 1-ethyl-3-methylimidazolium ion, 1-methyl-3-propylimidazolium ion, 1-butyl-3-methylimidazole ion, 1-methyl-3-pentylimidazolium ion, 1-hexyl-3-methylimidazolium ion, and so on.

A second place of the imidazolium ion may be substituted. Examples of the cation of the imidazolium ion whose second place is substituted include 1-ethyl-2,3-dimethylimidazolium ion, 1,2-dimethyl-3-propylimidazolium ion, 1-butyl-2,3-dimethyl-3-pentylimidazolium ion, 1,2-dimethyl-3-pentylimidazolium ion, 1-hexyl-2,3-dimethylimidazolium ion, and so on.

Examples of the pyridinium ion include methylpyridinium, ethylpyridinium, propylpyridinium, butylpyridinium, pentylpyridinium, hexylpyridinium, and so on. In both of the imidazolium ion and the pyridinium ion, an alkyl group may be substituted, or an unsaturated bond may exist.

Examples of the anion include fluoride ion ($F^-$), chloride ion ($Cl^-$), bromide ion ($Br^-$), iodide ion ($I^-$), $BF_4^-$, $PF_6^-$, $CF_3COO^-$, $CF_3SO_3^-$, $NO_3^-$, $SCN^-$, $(CF_3SO_2)_3C^-$, bis(trifluoromethoxysulfonyl)imide, bis(trifluoromethoxysulfonyl) imide, bis(perfluoroethylsulfonyl)imide, and so on. Dipolar ions in which the cations and the anions of the ionic liquid are coupled by hydrocarbons may be used. Incidentally, a buffer solution such as a potassium phosphate solution may be supplied to the first and second accommodation tanks 24, 25.

For the diaphragm 4, a membrane capable of selectively allowing the anion or the cation to pass therethrough, or the like is used. This makes it possible to make the electrolytic solutions that are in contact with the cathode 12 and the anode 13 respectively electrolytic solutions containing different substances, and further to promote the reduction reaction and the oxidation reaction depending on the difference in ionic strength, the difference in pH, or the like. The diaphragm 4 can be used to separate the first electrolytic solution from the second electrolytic solution. The diaphragm 4 may have a function of permeating part of ions contained in the electrolytic solutions in which the cathode 12 and the anode 13 are immersed therethrough, namely, a function of blocking one or more kinds of ions contained in the electrolytic solutions. This can differ, for example, the pH, or the like between the two electrolytic solutions. Further, in terms of the blocking of ions, a diaphragm that does not completely block some ions but is effective enough to limit the amount of movement by ion species may be used.

As the diaphragm 4, an ion exchange membrane such as, for example, NEOSEPTA (registered trademark) of ASTOM Corporation, Selemion (registered trademark), Aciplex (registered trademark) of ASAHI GLASS CO., LTD., Fumasep (registered trademark), fumapem (registered trademark) of Fumatech GmbH, Nafion (registered trademark) being fluorocarbon resin made by sulfonating and polymerizing tetrafluoroethylene of E.I. du Pont de Nemours and Company, lewabrane (registered trademark) of LANXESS AG, IONSEP (registered trademark) of IONTECH Inc., Mustang (registered trademark) of PALL Corporation, ralex (registered trademark) of mega Corporation, or Gore-Tex (registered trademark) of Gore-Tex Co., Ltd. can be used. Besides, the ion exchange membrane may be composed using a membrane having hydrocarbon as a basic skeleton or a membrane having an amine group in anion exchange. In the case where the first electrolytic solution and the second electrolytic solution are different in pH, the electrolytic solutions can be used while stably keeping the pHs thereof by using a bipolar membrane made by stacking a cation exchange membrane and an anion exchange membrane.

Other than the ion exchange membrane, for example: porous membranes of a silicone resin, fluorine-based resins such as perfluoroalkoxyalkane (PFA), perfluoroethylene propene copolymer (FEP), polytetrafluoroethylene (PTFE), ethylene-tetrafluoroethylene copolymer (ETFE), polyvinylidene fluoride (PVDF), polychlorotrifluoroethylene (PCTFE), ethylene-chlorotrifluoroethylene copolymer (ECTFE) and so on, and ceramics; insulating porous bodies of packing filled with glass filter, agar and so on, zeolite, oxide, and so on; and so on, can be used as the diaphragm 4. In particular, a hydrophilic porous membrane never causes clogging due to air bubbles and is thus preferable as the diaphragm 4.

The cathode 12 is an electrode that reduces $CO_2$ supplied as gas or $CO_2$ contained in the first electrolytic solution to produce a carbon compound. In the electrochemical reaction cell 5A, the cathode 12 is arranged to be in contact with the first flow path 14 to be immersed in the first electrolytic solution, and in the electrochemical reaction cell 5B, the cathode 12 is arranged in the first accommodation tank 24 to be immersed in the first electrolytic solution. The cathode 12 contains a reduction catalyst for producing the carbon compound by the reduction reaction of $CO_2$. As the reduction catalyst, a material that reduces activation energy for reducing $CO_2$ is used. In other words, there is used a material that reduces an overpotential when the carbon compound is produced by the reduction reaction of $CO_2$.

For example, a metal material or a carbon material can be used as the cathode 12. As the metal material, for example, a metal such as gold, aluminum, copper, silver, platinum, palladium, zinc, mercury, indium, nickel, or titanium, an alloy containing the metal, or the like can be used. As the carbon material, for example, graphene, carbon nanotube (CNT), fullerene, ketjen black, or the like can be used. Incidentally, the reduction catalyst is not limited to the above but, for example, a metal complex such as a Ru complex or a Re complex, or an organic molecule having an imidazole skeleton or a pyridine skeleton may be used as the reduction catalyst. The reduction catalyst may be a mixture of a plurality of materials. The cathode 12 may have, for example, a structure having the reduction catalyst in a thin film shape, a mesh shape, a particle shape, a wire shape, or the like provided on a conductive substrate.

Examples of the carbon compound produced by the reduction reaction at the cathode 12 include carbon monoxide (CO), formic acid (HCOOH), methane ($CH_4$), methanol ($CH_3OH$), ethane ($C_2H_6$), ethylene ($C_2H_4$), ethanol ($C_2H_5OH$), formaldehyde (HCHO), ethylene glycol ($C_2H_6O_2$), and so on though different depending on the kind or the like of the reduction catalyst. Further, at the cathode 12, a side reaction of producing hydrogen ($H_2$) by the reduction reaction of $H_2O$ may occur at the same time with the reduction reaction of $CO_2$.

The anode 13 is an electrode that oxidizes substances to be oxidized such as substances and ions in the second electrolytic solution. For example, water ($H_2O$) is oxidized to produce oxygen and a hydrogen peroxide solution, or chloride ions ($Cl^-$) are oxidized to produce chlorine. In the electrochemical reaction cell 5A, the anode 13 is arranged to be in contact with the second flow path 13 to be immersed in the second electrolytic solution, and in the electrochemical reaction cell 5B, the anode 13 is arranged in the second accommodation tank 25 to be immersed in the second electrolytic solution. The anode 13 contains an oxidation catalyst for a substance to be oxidized such as $H_2O$. As the oxidation catalyst, a material that reduces activation energy when oxidizing the substance to be oxidized, in other words, a material that reduces a reaction overpotential is used.

Examples of the oxidation catalyst material include metals such as ruthenium, iridium, platinum, cobalt, nickel, iron, and manganese. Further, a binary metal oxide, a ternary metal oxide, a quaternary metal oxide, or the like can be used. Examples of the binary metal oxide include manganese oxide (Mn—O), iridium oxide (Ir—O), nickel oxide (Ni—O), cobalt oxide (Co—O), iron oxide (Fe—O), tin oxide (Sn—O), indium oxide (In—O), ruthenium oxide (Ru—O), and so on. Examples of the ternary metal oxide include Ni—Fe—O, Ni—Co—O, La—Co—O, Ni—La—O, Sr—Fe—O, and so on. Examples of the quaternary metal oxide include Pb—Ru—Ir—O, La—Sr—Co—O, and so on. Incidentally, the oxidation catalyst is not limited to the above, but a metal hydroxide containing cobalt, nickel, iron, manganese, or the like, or a metal complex such as a Ru complex or a Fe complex can be used as the oxidation catalyst. Further, a plurality of materials may be mixed together to be used.

The anode 13 may be composed of a composite material containing both the oxidation catalyst and a conductive material. Examples of the conductive material include: carbon materials such as carbon black, activated carbon, fullerene, carbon nanotube, graphene, ketjen black, and diamond; transparent conductive oxides such as indium tin oxide (ITO), zinc oxide (ZnO), fluorine-doped tin oxide (FTO), aluminum-doped zinc oxide (AZO), and antimony-doped tin oxide (ATO); metals such as Cu, Al, Ti, Ni, Ag, W, Co, and Au; and alloys each containing at least one of the metals. The anode 13 may have a structure having the oxidation catalyst in a thin film shape, a mesh shape, a particle shape, a wire shape, or the like provided on a conductive substrate, for example. As the conductive substrate, for example, a metal material containing titanium, titanium alloy, or stainless steel is used.

The power supply 18 is to supply power to make the electrochemical reaction cell 5 cause the oxidation-reduction reaction, and is electrically connected to the cathode 12 and the anode 13. The electric energy supplied from the power supply 18 is used to cause the reduction reaction by the cathode 12 and the oxidation reaction by the anode 13. The power supply 18 and the cathode 12 are connected and the power supply 18 and the anode 13 are connected, for example, by wiring. Between the electrochemical reaction cell 5 and the power supply 18, pieces of electric equipment such as an inverter, a converter, and a battery may be installed as needed. The drive system of the electrochemical reaction cell 5 may be a constant-voltage system or may be a constant-current system.

The power supply 18 may be a commercial power supply, a battery, or the like, or may be a power supply that supplies electric energy obtained by converting renewable energy. Examples of such a power supply include a power supply that converts kinetic energy or potential energy such as wind power, water power, geothermal power, or tidal power to electric energy, a power supply such as a solar cell including a photoelectric conversion element that converts light energy to electric energy, a power supply such as a fuel cell or a storage battery that converts chemical energy to electric energy, and a power supply such as an apparatus that converts vibrational energy such as sound to electric energy. The photoelectric conversion element has a function of performing charge separation by emitted light energy of sunlight or the like. Examples of the photoelectric conversion element include a pin-junction solar cell, a pn-junction solar cell, an amorphous silicon solar cell, a multijunction solar cell, a single crystal silicon solar cell, a polycrystalline silicon solar cell, a dye-sensitized solar cell, an organic thin-film solar cell, and so on. Further, the photoelectric conversion element may be stacked on at least one of the cathode 12 and the anode 13 inside the reaction tank.

Next, the operation of the carbon dioxide reaction apparatus 1 will be explained. Here, there will be described the case of reducing $CO_2$ to mainly produce carbon monoxide (CO) and oxidizing $H_2O$ to produce oxygen. When a voltage that is equal to or more than a bath voltage is applied between the cathode 12 and the anode 13, the oxidation reaction of $H_2O$ occurs near the anode 13 in contact with the second electrolytic solution. As expressed in the following expression (1), the oxidation reaction of $H_2O$ contained in the second electrolytic solution occurs, electrons are lost, and oxygen ($O_2$) and hydrogen ions ($H^+$) are produced. A part of the produced hydrogen ions ($H^+$) move through the diaphragm 4 into the first electrolytic solution in the first accommodation part 2.

$$2H_2O \rightarrow 4H^+ + O_2 + 4e^- \qquad (1)$$

When the hydrogen ions ($H^+$) produced on the anode 13 side reach the vicinity of the cathode 12 and electrons ($e^-$) are supplied to the cathode 12 from the power supply 18, the reduction reaction of $CO_2$ occurs. As expressed in the following expression (2), $CO_2$ contained in the electrolytic solution is reduced by the hydrogen ions ($H^+$) moved to the vicinity of the cathode 12 and the electrons ($e^-$) supplied from the power supply 18 to produce carbon monoxide (CO).

$$2CO_2 + 4H^+ + 4e^- \rightarrow 2CO + 2H_2O \qquad (2)$$

Incidentally, the reduction reaction of $CO_2$ is not limited to the CO production reaction but may be a production reaction of ethanol ($C_2H_5OH$), ethylene ($C_2H_4$), ethane ($C_2H_6$), methane ($CH_4$), methanol ($CH_3OH$), acetic acid ($CH_3COOH$), propanol ($C_3H_7OH$), or the like.

As expressed in the above expression (1), the gas component discharged from the second flow path 15 or the second accommodation tank 25 on the anode 13 side has been considered to be an oxygen ($O_2$) gas primarily. The discharged gas on the anode 13 side, which has been considered to be an $O_2$ gas, has been released into the atmosphere unless it is reused. In the above-described reactions at the cathode 12 and the anode 13, $CO_2$ supplied to the cathode 12 side is subjected to a reduction reaction at the cathode 12, but a part of $CO_2$ flows into the anode 13 side as $CO_2$ or as carbonate ions ($CO_3^{2-}$), hydrogen carbonate ions ($HCO_3^-$), or the like. The carbonate ions ($CO_3^{2-}$) or the hydrogen carbonate ions ($HCO_3^-$) that have moved to the anode 13 side become present as $CO_2$ by a chemical equilibrium reaction when the pH of the anode solution (the second electrolytic solution) becomes, for example, six or less, and a part of $CO_2$ is dissolved in the anode solution. Such a $CO_2$ gas, which is not fully dissolved in the anode solution, will be contained with the $O_2$ gas in the gas discharged from the anode 13 side. Under general operation conditions of the electrochemical reaction cell 5, the abundance ratio of $CO_2$ to $O_2$ in the discharged gas from the anode 13 side increases up to, for example, 3:1 in some cases. The ratio (volume ratio) of $CO_2$ to $O_2$ varies depending on the operation condition, and is considered to be about $CO_2:O_2$=4:6 to 8:2.

In the case where such a gas containing $CO_2$ and $O_2$ as above is released into the atmosphere as the discharged gas on the anode 13 side, the burden on the environment increases, and at the same time, the use efficiency of $CO_2$ and the use efficiency and the utility value of the reduction products of $CO_2$ are reduced. Thus, in the carbon dioxide reaction apparatus 1 in the embodiment, the $CO_2$ separation part 8 that separates and recovers $CO_2$ in the discharged gas is connected to the discharge portion that discharges the gas component (gas component containing $O_2$ and $CO_2$) from the second accommodation part in the electrochemical reaction cell 5. Concretely, in the case of the electrochemical reaction cell 5A, the $CO_2$ separation part 8 is connected to a gas component discharge portion of the gas/liquid separation part 23 connected to the circulation path 21 through which the second electrolytic solution is circulated. In the case of the electrochemical reaction cell 5B, the $CO_2$ separation part 8 is connected to the second discharge flow path 26 connected to the storage space for a produced gas provided in the upper portion of the second accommodation tank 25.

Figure 4:
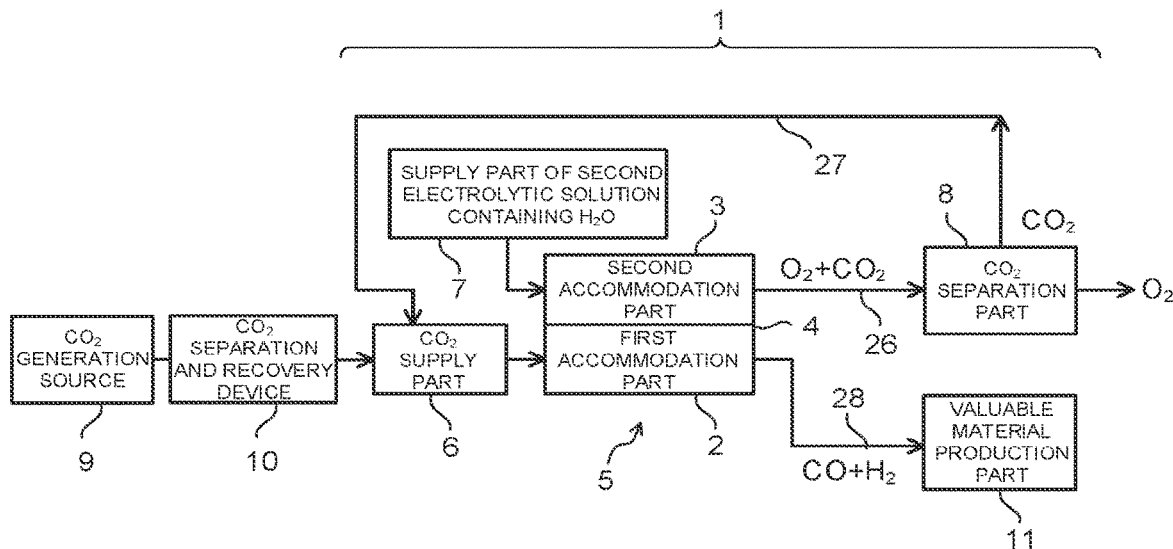
FIG. 4 is a diagram illustrating a first modified example of the carbon dioxide reaction apparatus in the first embodiment.

The $CO_2$ gas separated in the $CO_2$ separation part 8 may be reused in an apparatus or the like different from the carbon dioxide reaction apparatus 1, but is preferably reused in the first accommodation part 2 in the carbon dioxide reaction apparatus 1. Concretely, as illustrated in FIG. 4, it is possible to connect, to the $CO_2$ supply part 6, a $CO_2$ resending flow path 27 connected to a $CO_2$ discharge port of the $CO_2$ separation part 8. This enables reuse of $CO_2$ discharged from the anode 13 side in the carbon dioxide reaction apparatus 1, resulting in that it is possible to increase the use efficiency of $CO_2$ and the use efficiency and the utility value of the reduction products of $CO_2$. The $CO_2$ resending flow path 27 may be directly connected to the first accommodation part 2 in the electrochemical reaction cell 5. Further, the $CO_2$ resending flow path 27 may be configured to resend $CO_2$ separated in the $CO_2$ separation part 8 to the $CO_2$ generation source 9 and the $CO_2$ separation and recovery device 10.

As the $CO_2$ separation part 8, a chemical absorption device of $CO_2$, a physical adsorption and separation device of $CO_2$, a membrane separation device of $CO_2$, a combustion or oxidation device, and the like can be applied. As the chemical absorption device of $CO_2$, there can be cited a device that separates and recovers $CO_2$ from an absorbing liquid by using an amine solution as the absorbing liquid, letting the absorbing liquid absorb $CO_2$ in the discharged gas, and then heating the resultant. It is also possible to configure the chemical absorption device by using a solid absorbent with amines, which are a chemical absorbent, supported on a porous support in place of using amines in the chemical absorption device of $CO_2$ as a solution. As the physical adsorption and separation device of $CO_2$, there can be cited a device that adsorbs $CO_2$ or $O_2$ on an adsorbent such as zeolite or molecular sieve and separates a main component or an impurity component by changing pressure, temperature, or the like. As the membrane separation device of $CO_2$, there can be cited a device that selectively selects and recovers $CO_2$ by using a separation membrane containing activated carbon, molecular sieve, or the like, a polymer membrane such as a molecular gate membrane, or the like. In any of the $CO_2$ separation parts 8, the concentration of $CO_2$ contained in the discharged gas is higher than that of the discharged gas of the $CO_2$ generation source 9, so that $CO_2$ can be separated with a small energy input.

Figure 5:
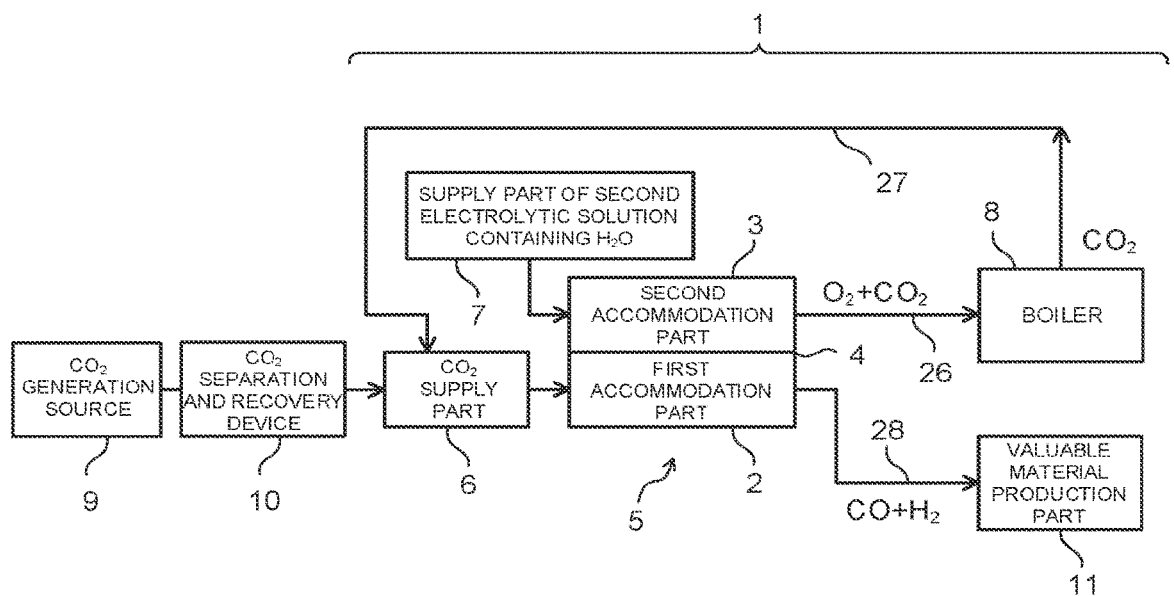
FIG. 5 is a diagram illustrating a second modified example of the carbon dioxide reaction apparatus in the first embodiment.

The $CO_2$ separation part 8 may be, as illustrated in FIG. 5, a boiler or the like that burns $O_2$ discharged with $CO_2$. When a gas containing $CO_2$ and $O_2$ is introduced into the boiler as the $CO_2$ separation part 8, $O_2$ turns into $CO_2$ by combustion to be discharged with initial $CO_2$ as a combustion gas. Thus, it is possible to improve the function as the boiler and recover $CO_2$. In place of the boiler as the $CO_2$ separation part 8, various combustion or oxidation devices, and so on can be used. These are to separate and recover $CO_2$ produced by combustion or oxidation together with initial $CO_2$, and can be used as the $CO_2$ separation part 8. The combustion or oxidation device such as the boiler can effectively use $O_2$ and separate and recover $CO_2$ efficiently.

Here, there has been explained the case where the $CO_2$ separation part (a first $CO_2$ separation part) 8 is connected to the discharge portion of the second accommodation part 3 that accommodates the second electrolytic solution containing water in the electrochemical reaction cell 5, but a second $CO_2$ separation part (not illustrated) may be connected also to the discharge portion of the first accommodation part 2 that accommodates $CO_2$. The configuration of the second $CO_2$ separation part is the same as the first $CO_2$ separation part, and a $CO_2$ separation device having the same configuration can be applied. Further, to the discharge portion of the first accommodation part 2, a hydrogen separation part (not illustrated) may be further connected as will be described later.

The valuable material production part 11 is a chemical synthesis device that chemically synthesizes a valuable material by using CO, and the like discharged from the first accommodation part 2 as a raw material. The produced gas discharged from the first accommodation part 2 in the electrochemical reaction cell 5 may be directly used or consumed, but the chemical synthesis device is provided at a subsequent stage of the electrochemical reaction cell 5, thereby making it possible to produce valuable materials with a high added value. The valuable material production part 11 is connected to a first discharge flow path 28 through which the produced gas discharged from the first accommodation part 2 flows. To the first discharge flow path 28, there may be connected a product separator or the like that separates redundant $CO_2$ from the discharged gas or separates CO or the like being a product by removing moisture in the discharged gas. To the valuable material production part 11, the produced gas such as CO is supplied from the first accommodation part 2 through the first discharge flow path 28. For example, when the CO gas is produced in the electrochemical reaction cell 5 by the above-described (2) expression, by using, as a raw material, a mixed gas obtained by mixing the produced CO gas and the $H_2$ gas as a by-product of the reduction reaction, methanol can be produced through methanol synthesis, or jet fuel, light oil, or the like can be produced through Fischer-Tropsch synthesis.

The valuable material production part 11 is not limited to the above-described chemical synthesis device, and is not limited in particular as long as it is capable of causing a reaction to synthesize another substance from the reduction product produced in the first accommodation part 2. The reaction of the reduction product by the valuable material production part 11 includes a chemical reaction, an electrochemical reaction, a biological conversion reaction using a product such as algae, enzyme, yeast, or bacteria, and so on. In the case where the chemical reaction, the electrochemical reaction, and the biological conversion reaction by bacteria are higher in temperature than room temperature, at least one parameter between reaction efficiency and a reaction rate sometimes improves. In the case where the reduction product introduced into the valuable material production part 11 is set to a temperature of 60° C. or more and 150° C. or less, it is possible to improve the energy conversion efficiency of the carbon dioxide reaction apparatus 1. The reaction of the biological conversion reaction by bacteria or the like progresses most efficiently at the temperature around 80° C., and thus when the reduction product is introduced into the valuable material production part 11 at a temperature of 60° C. or more and 100° C. or less, the efficiency further improves. The valuable material production part 11 may be heated or pressurized by applying energy thereto from outside, in order to improve the reaction efficiency.

The reduction product may contain $H_2$ obtained by electrolysis of $CO_2$, CO, and $H_2O$. The concentration of $H_2$ can be arbitrarily adjusted depending on uses. In the case where $H_2$ is used in the valuable material production part 11, $CO_2$ may be separated to be used, in order to use $H_2$ as a mixture of CO and $H_2$. In the case where $H_2$ is not used, CO is only separated. As a device to separate $CO_2$ or $H_2$ in the reduction product, the chemical absorption device, the physical adsorption and separation device, the membrane separation device, the combustion or oxidation device, and the like are applicable. In terms of the separation of $H_2$, a low-temperature separation device may be used. Further, even in the case where only CO is separated, the chemical absorption device, the physical adsorption and separation device, and the membrane separation device are applicable. At this time, the various separation devices are arranged between the carbon dioxide reaction apparatus 1 and the valuable material production part 11. In the case of producing methanol or the like, it is possible to use $H_2$, which is a side reactant in the first accommodation part 2 in the electrochemical reaction cell 5, as a valuable material by adjusting the number of moles of $H_2$ to about twice the number of moles of CO. In the meantime, in the first accommodation part 2, the side reaction of $H_2$ is suppressed by the reaction condition, thereby making it also possible to adjust the concentration of $H_2$ in the reduction product to a range of 0.1% or more and 5% or less in volume percent. This makes it possible to use the carbon dioxide reaction apparatus as a CO production device that provides high-concentration CO.

Figure 6:
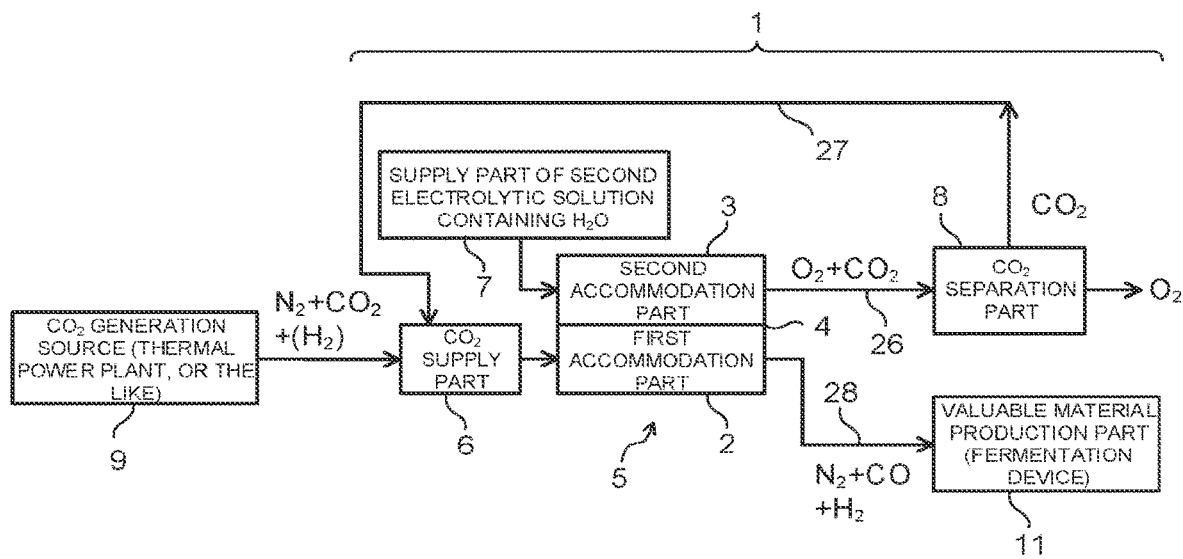
FIG. 6 is a diagram illustrating a third modified example of the carbon dioxide reaction apparatus in the first embodiment.

The valuable material production part 11 can be further used in various forms. Depending on the kind of a thermal power plant, a blast furnace, or the like as the $CO_2$ generation source 9, for example, each component in the discharged gas is sometimes contained in a specific ratio, as illustrated in FIG. 6, for example. The gas discharged from, for example, the thermal power plant, the blast furnace, or the like contains $N_2$ and $CO_2$ mainly and further contains $H_2$ as a secondary component, and the content ratio of $CO_2$ is about 15% in some cases. When such a discharged gas is directly sent to the first accommodation part 2 to cause a reduction reaction of $CO_2$ in the first accommodation part 2, a mixed gas containing produced CO, $H_2$ as a by-product, and redundant $CO_2$, and $N_2$ is discharged from the first accommodation part 2. Such a mixed gas containing CO, $CO_2$, $H_2$, and $N_2$ is sometimes preferable as a raw material gas of a fermentation reaction device (gas fermentation and anaerobic respiration), namely, a biosynthesis device that produces fuel or chemical substances such as methanol, ethanol, and butanol by anaerobic microorganisms as the valuable material production part 11. The mixed gas discharged from the above-described first accommodation part 2 is supplied, as the raw material gas, to such a biosynthesis device, thereby making it possible to increase the use efficiency and the utility value of the reduction product of $CO_2$. Further, the $CO_2$ separation and recovery device 10 as a preceding stage of the carbon dioxide reaction apparatus 1 is no longer required, so that it is possible to provide a more inexpensive and higher efficient system.

Figure 7:
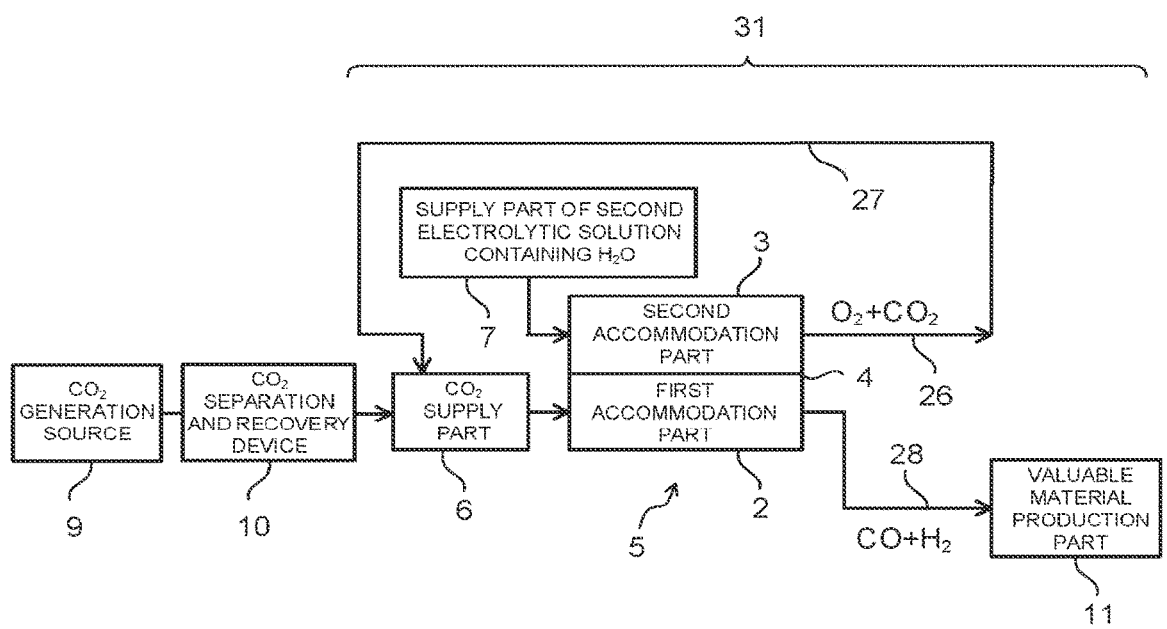
FIG. 7 is a diagram illustrating a carbon dioxide reaction apparatus in a second embodiment.

(Second embodiment) There will be explained a carbon dioxide reaction apparatus 31 in a second embodiment with reference to FIG. 7 to FIG. 10. FIG. 7 is a diagram illustrating the carbon dioxide reaction apparatus 31 in the second embodiment. The carbon dioxide reaction apparatus 31 illustrated in FIG. 7 includes: an electrochemical reaction cell 5 including a first accommodation part 2 configured to accommodate gas containing $CO_2$ or a first electrolytic solution containing $CO_2$, a second accommodation part 3 configured to accommodate a second electrolytic solution containing $H_2O$, and a diaphragm 4; a first supply part 6 that supplies the gas or the first electrolytic solution to the first accommodation part 2; and a second supply part 7 that supplies the second electrolytic solution to the second accommodation part 3. The concrete configurations of the electrochemical reaction cell 5, the first supply part 6, and the second supply part 7 are the same as those in the first embodiment, and are as described above.

A $CO_2$ generation source 9 or a $CO_2$ separation and recovery device 10 attached to the $CO_2$ generation source 9 is connected to the first supply part ($CO_2$ supply part) 6 similarly to the first embodiment. Concrete examples of the $CO_2$ generation source 9 are the same as those in the first embodiment. To a discharge portion that discharges a discharged gas containing CO and the like from the first accommodation part 2, a valuable material production part 11 is connected. Concrete examples of the valuable material production part 11 are also the same as those in the first embodiment, and in place of the valuable material production part 11, a tank or the like that stores the discharged gas containing CO and the like may be connected to the gas discharge portion of the first accommodation part 2.

In the carbon dioxide reaction apparatus 31 in the second embodiment, a discharge portion that discharges a discharged gas containing $O_2$ and $CO_2$ from the second accommodation part 3 is directly connected to the $CO_2$ supply part 6 without being connected to the $CO_2$ separation part 8 used in the first embodiment. That is, one end of a $CO_2$ resending flow path 27 is connected to the gas discharge portion of the second accommodation part 3, and the other end thereof is connected to the $CO_2$ supply part 6. Even when such a configuration is employed, as described previously, the discharged gas from the second accommodation part 3 can be used effectively as the raw material for the reduction reaction of $CO_2$ in the first accommodation part 2, and at the same time, the discharge of $CO_2$ from the second accommodation part 3 can be suppressed because the discharged gas contains a relatively high concentration of $CO_2$. Thus, it is possible to increase the use efficiency of $CO_2$ and the use efficiency and the utility value of the reduction products of $CO_2$, and at the same time, provide the carbon dioxide reaction apparatus 31 whose burden on the environment is reduced.

Figure 8:
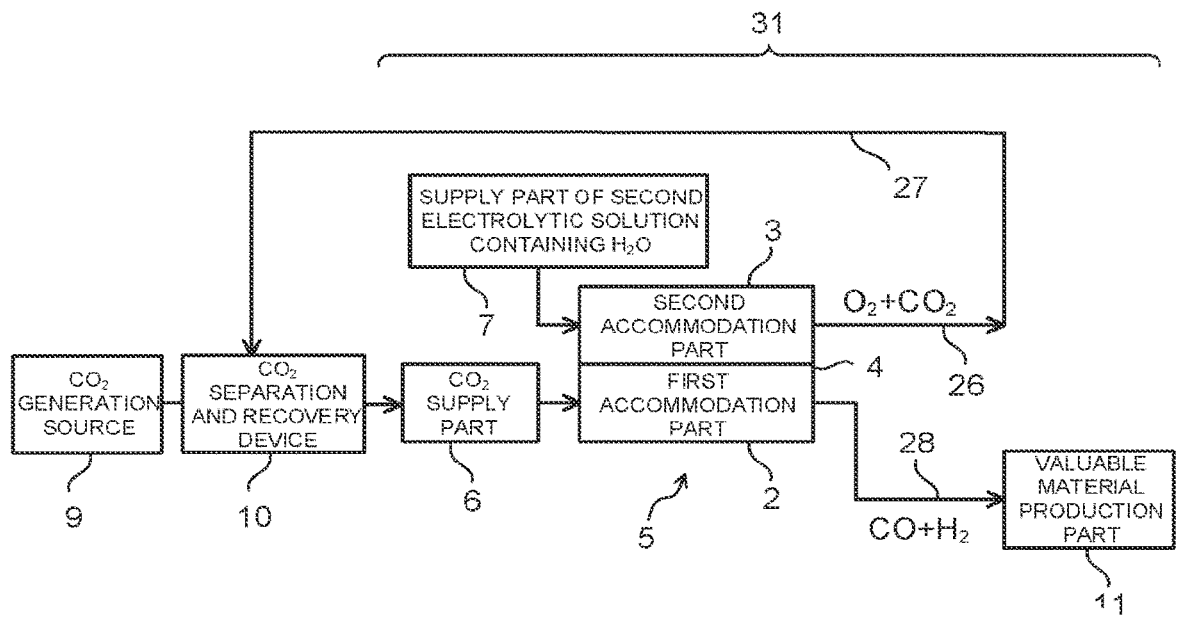
FIG. 8 is a diagram illustrating a first modified example of the carbon dioxide reaction apparatus in the second embodiment.
Figure 9:
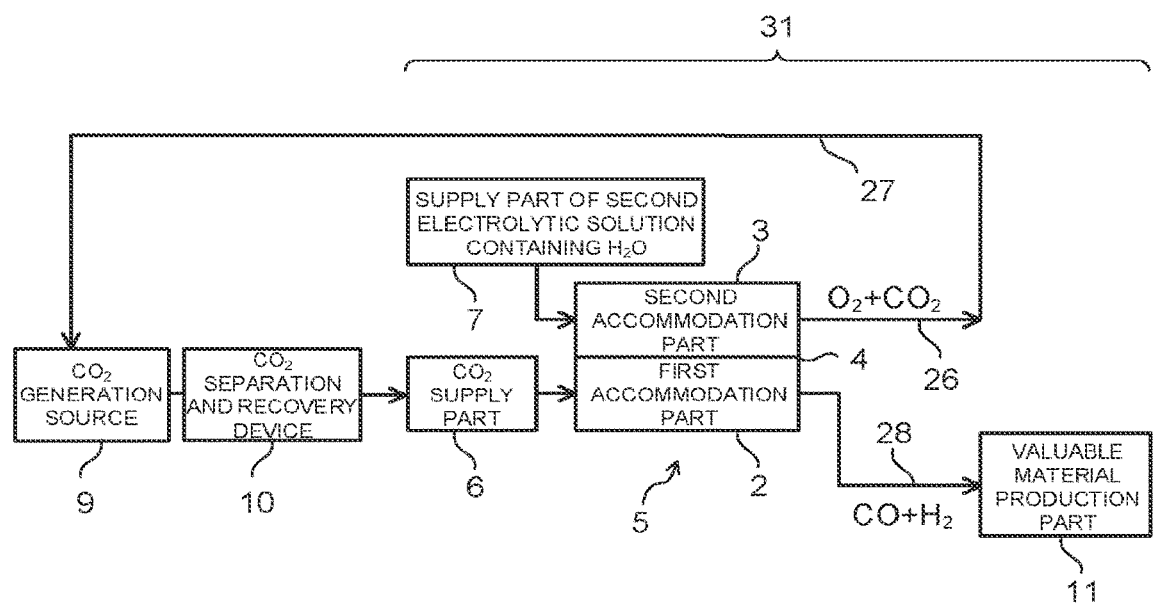
FIG. 9 is a diagram illustrating a second modified example of the carbon dioxide reaction apparatus in the second embodiment.
Figure 10:
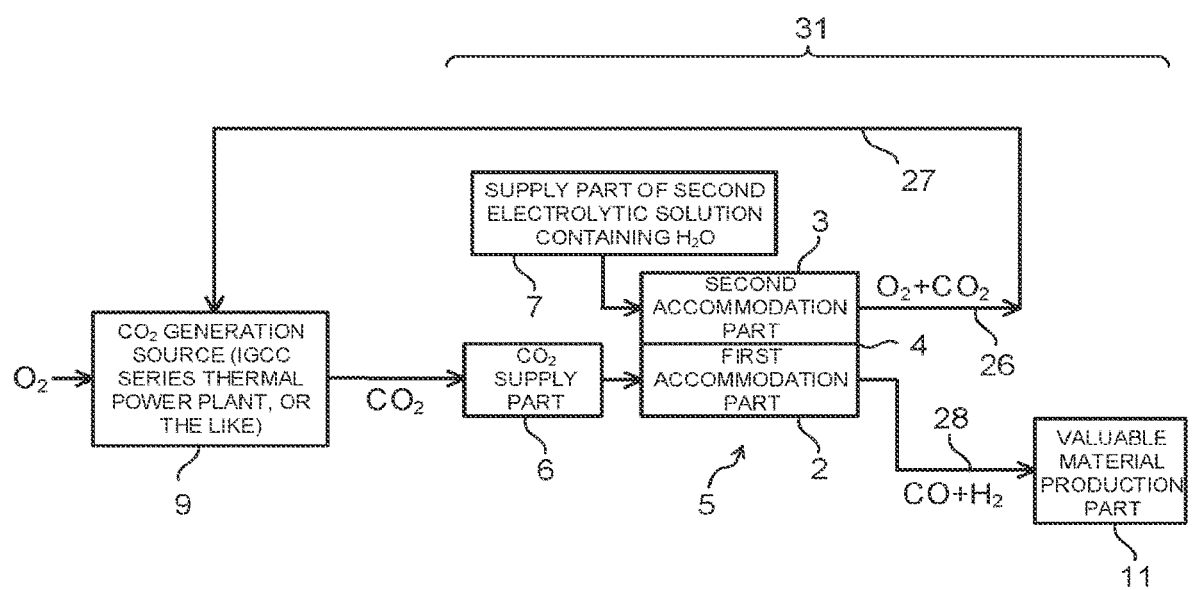
FIG. 10 is a diagram illustrating a third modified example of the carbon dioxide reaction apparatus in the second embodiment.

The $CO_2$ resending flow path 27 that resends the gas discharged from the second accommodation part 3 may be connected to the CO$_2$ separation and recovery device 10 as illustrated in FIG. 8. Further, the CO$_2$ resending flow path 27 may be connected to the CO$_2$ generation source 9 as illustrated in FIG. 9. At this time, as illustrated in FIG. 10, in the case where the CO$_2$ generation source 9 is a thermal power generation apparatus such as an integrated coal gasification combined cycle (IGCC), O$_2$ is used for a gasification reaction of coal when gasifying coal as a fuel to use the resultant. Thus, the discharged gas containing O$_2$ and CO$_2$, which is discharged from the second accommodation part 3, is resupplied to the CO$_2$ generation source 9, thereby making it possible to convert O$_2$ in the discharged gas to CO$_2$ and send converted CO$_2$ to the CO$_2$ supply part 6 together with CO$_2$ in the discharged gas. Thus, with the increases in availability and use efficiency of O$_2$ as well as the improvement in use efficiency of CO$_2$, it becomes possible to provide the carbon dioxide reaction apparatus 31 whose burden on the environment is reduced.

Note that the above-described configurations in the embodiments are applicable in combination, and parts thereof are also replaceable. While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A carbon dioxide reaction method, comprising:

separating and recovering carbon dioxide gas from a CO$_2$ generation source to obtain a separated and recovered gas containing carbon dioxide;

supplying the separated and recovered gas containing carbon dioxide to a first accommodation part of an electrochemical reaction cell from a first supply unit, the electrochemical reaction cell including the first accommodation part, a second accommodation part, a diaphragm provided between the first accommodation part and the second accommodation part, a reduction electrode arranged in the first accommodation part, and an oxidation electrode arranged in the second accommodation part;

supplying an electrolytic solution containing water to the second accommodation part of the electrochemical reaction cell;

controlling a temperature of the electrochemical reaction cell in a range of from 60° C. to 150° C. so that temperatures of a discharged gas discharged from the first accommodation part and a discharged solution discharged from the second accommodation part become a temperature in a range of from 60° C. to 100° C.;

supplying an electric current from a power supply to the reduction electrode and the oxidation electrode, to reduce the carbon dioxide in the reduction electrode and discharge the discharged gas having the temperature in a range of from 60° C. to 100° C. from the first accommodation part, and to oxidize water in the oxidation electrode and discharge the discharged solution containing oxygen and first carbon dioxide, which moves to the second accommodation part from the first accommodation part through the diaphragm, and having the temperature in a range of from 60° C. to 100° C. from the second accommodation part;

separating a gas component containing oxygen and the first carbon dioxide and a solution component in the discharged solution;

combusting the gas component containing the oxygen and the first carbon dioxide of the discharged solution from the second accommodation part to produce second carbon dioxide by combusting the oxygen, and discharging a mixing carbon dioxide gas containing the second carbon dioxide, produced by combustion, and the first carbon dioxide contained originally in the gas component, the gas component being combusted in a boiler different from the CO$_2$ generation source connected to the second accommodation part via a gas/liquid separation part which separates the gas component and the solution component; and mixing the second carbon dioxide with the separated and recovered gas containing carbon dioxide to be supplied to the first accommodation part.

2. The method of claim 1, wherein the temperature of the electrochemical reaction cell is controlled in a range of from 80° C. to 150° C.

3. The method of claim 1, wherein a current density of the electric current supplied from the power supply is 100 mA/cm$^2$ or more and 1.5 A/cm$^2$ or less.

4. The method of claim 1, wherein a volume ratio of carbon dioxide and oxygen in the gas component of the discharged solution is CO$_2$:O$_2$ is in a range of from 4:6 to 8:2.

* * * * *